Patented Sept. 24, 1935

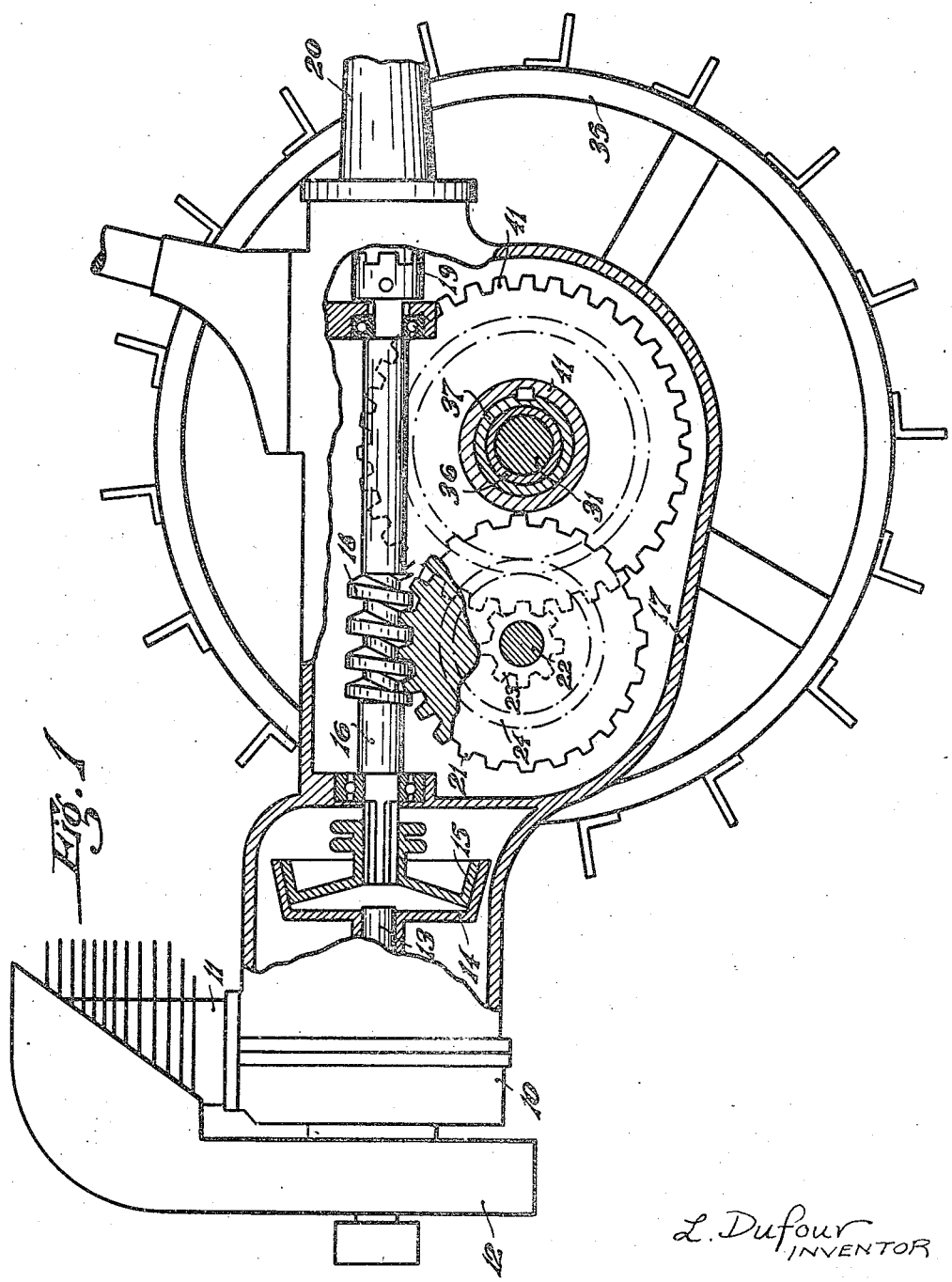

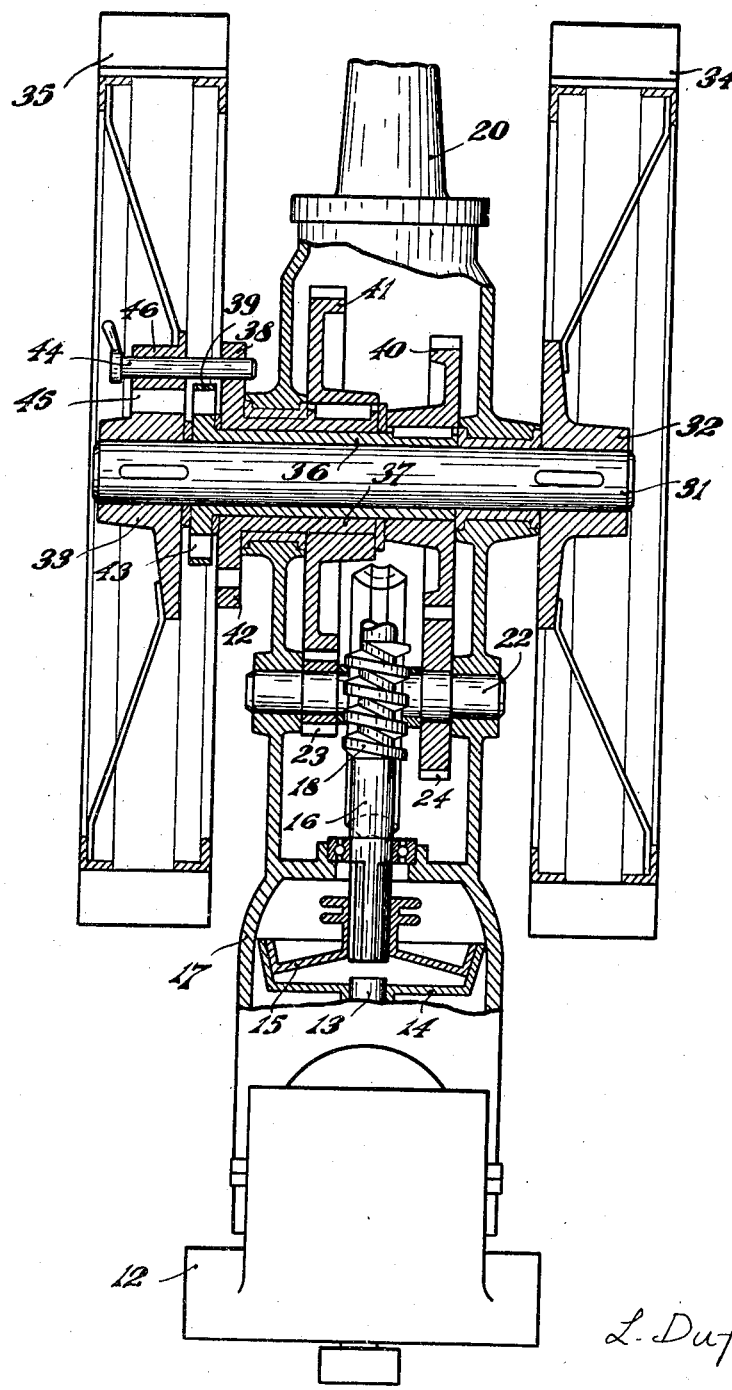

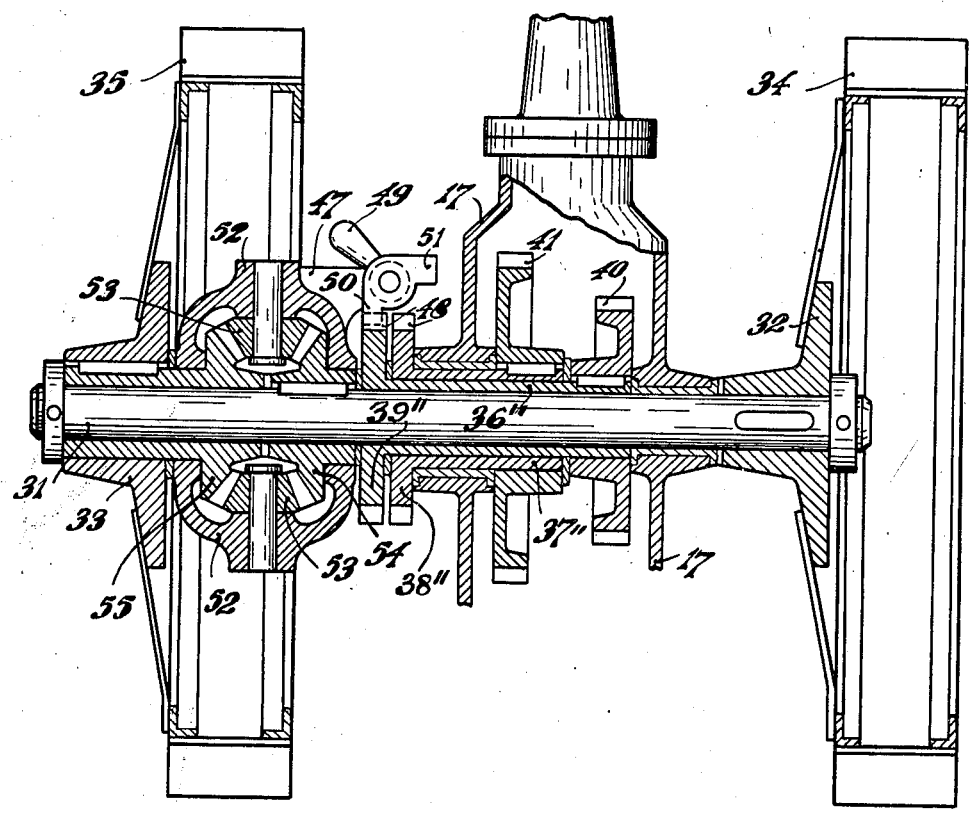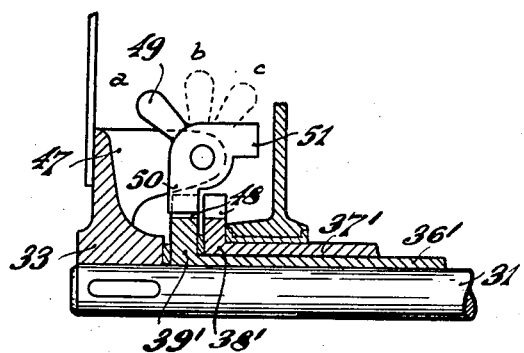

2,015,218

UNITED STATES PATENT OFFICE 2,015,218

MOTOR PROPELLED CULTIVATOR

Léon Dufour, Versoix, Switzerland

Application October 13, 1934, Serial No. 748,238
In Switzerland September 18, 1934

4 Claims. (Cl. 180—19)

The present invention relates to motor propelled cultivators or small tractors, and particularly to change speed gears adapted for use with such cultivators or tractors, and constitutes an improvement on the device disclosed in my prior U. S. Patent Specification No. 1,975,417.

The change speed gear disclosed in the said patent comprises two coupling sleeves loosely mounted on the driving axle of the tractor to which are keyed the two traction wheels, each of said two sleeves being disposed adjacent to the hub of one of the traction wheels and being continuously connected to the motor of the tractor which drives them at different speeds, while coupling means are provided for selectively coupling one or the other of the sleeves to its adjacent wheel hub to make the tractor move at a slower or at a faster speed.

The object of the present invention is the provision of a change speed gear for motor propelled cultivators or small tractors of the above type in which both coupling sleeves are disposed adjacent to the same traction wheel so that the change of speed can be effected from one side of the tractor only, it being not necessary, after disengaging one wheel from one of the coupling sleeves, to go on the other side of the tractor for engaging the second traction wheel with the other coupling sleeve.

Another object is the provision of a differential gear for transmitting the speed from the coupling sleeves to the traction wheels.

The invention consists in the construction, arrangement and combination of the various parts of the device, as hereinafter more fully set forth, and pointed out in the claims, and illustrated in the accompanying drawings, in which:

Figure 1 is a side elevation of a driving unit of a cultivator or small tractor according to the invention, partly drawn in longitudinal section.

Figure 2 is a plan view of the driving unit, partly drawn in horizontal section through the axis of the traction wheels.

Figure 3 shows a modification of a detail of the change speed control device.

Figure 4 is a horizontal section along the driving axle of a modified driving unit comprising a differential gear for transmission of movement to the traction wheels.

The driving unit represented in Figures 1 and 2 comprises an internal combustion motor 10 having a cylinder 11 and a cooler 12.

The motor shaft 13 is connected to one part 14 of a friction clutch the other part 15 of which is slidably mounted on an intermediate shaft 16 extending in a gear casing 17. The actuating means for the friction clutch being of conventional design, are not shown. The shaft 16 carries a worm gear 18 and its rear end is provided with a part 19 of a claw coupling forming a power take off for the cultivating tools. The worm gear transmits movement from the motor to the driving axle, while the coupling part 19 transmits movement to the cultivating tools which may be secured to the rear of the driving unit, such as rotary tilling cutters, mowers, or other tools. The represented driving unit may however be used as tractor only for pulling a plow or other implements in which case the coupling part 19 would not be used. The member 20 may thus indicate a plow carrier as well as the central arm of rotary tilling tools.

The worm 18 drives a worm wheel 21 carried by a shaft 22 to which are secured a small pinion 23 and a greater pinion 24. The driving axle 31 has keyed thereon the hubs 32 and 33 of the two traction wheels 34 and 35. A sleeve 36 is loosely mounted on the axle 31 and a second sleeve 37 is loosely mounted on the first sleeve 36. The sleeve 37 is rigid with a coupling disk 38 and the sleeve 36 is rigid with a coupling disk 39 of smaller diameter than the disk 38. These two disks are situated adjacent the hub 33 of the traction wheel 35. A gear wheel 40 is keyed to the sleeve 36 and constantly meshes with the pinion 24 secured to the shaft 22, while a second gear wheel 41 is keyed to the sleeve 37 and constantly meshes with the pinion 23 on the shaft 22. The coupling disk 38 is provided with a series of holes 42 and the disk 39 is likewise provided with holes 43. The hub 33 is provided with two holes 45 and 46 registering with the holes 43 and 42, respectively in the coupling disks 39 and 38. A coupling bolt 44 can be introduced through the hole 46 and one of the holes 42 in the disk 38, or through the hole 45 and one of the holes 43 in the disk 39. In the first case, as represented in Fig. 2, the bolt 46 connects the wheel's hub 33 to the sleeve 37 carrying the wheel 41 which is meshing with the smaller pinion 23 on the shaft 22 so that upon starting the motor, the tractor moves at slow speed. In order to pass to second or fast speed, the bolt 44 is removed from the holes 42 and 46 and introduced into the hole 45 of the wheel hub and the hole 43 of the disk 39. The wheel hub is then connected to the sleeve 36 carrying the gear wheel 40 which meshes with the larger pinion on the shaft 22. It will thus be seen that the speed of the tractor can be changed by the operator from one side of the tractor by singly pulling the bolt 44 out of two registering holes in the traction wheel hub and an adjacent coupling disk and introducing this bolt into two other registering holes in the hub and in a second adjacent coupling disk.

Figure 3 shows a modified operating means for effecting the change of speed. Two loose sleeves 36' and 37' carry each a coupling disk 39' and 38', respectively, which have the same diameter and have their peripheries provided with teeth or claws 48. A bracket 47 is rigid with the hub 33 of the traction wheel and carries a rotatable bolt member 49 provided with two teeth 50 and 51. The bolt member 49 can be brought into either of three positions a, b, or c. In the represented position a, the tooth 50 is engaging between two teeth 48 of the disk 39'. In the position b the bolt is engaging neither of the disks 38' or 39' and no movement is transmitted to the wheel hub 33. In the position c the tooth 51 is engaging the disk 38' and the speed of the sleeve 37' is transmitted to the wheel hub.

In the modification according to Fig. 4 the motor of the tractor is again continuously connected to the gear wheels 40 and 41 keyed to the sleeves 36" and 37" respectively, which are rigid with coupling disks 39" and 38" respectively. Between these disks and the hub 33 of the traction wheel 35 there is mounted, on the driving axle 31, a differential gear for transmitting the movement from the disks to the shaft. This differential gear comprises a casing 52 carrying the satellite wheels 53. The casing 52 is provided with the bracket 47 on which is mounted the bolt 49 which can lock one or the other of the two disks 38", 39", to the casing 52. The bevel sun gear 54 of the differential is keyed to the driving axle 31 to which is also keyed the hub 32 of the traction wheel 34. The other bevel wheel 55 is loose on the driving axle, but rigid with the hub 33 of the traction wheel 35.

Precisely owing to the fact that the two coupling disks are disposed adjacent to each other and on the same side of the tractor, it is possible to provide a differential gear on this same side for transmitting movement from the motor actuated sleeves to the traction wheels of the cultivator.

I claim:

1. In a change speed gear for motor propelled cultivators or small tractor having two traction wheels, a driving axle connecting the two wheels, two sleeves freely rotatable on said axle intermediate the two traction wheels, one of the sleeves being loosely mounted within the other sleeve, one of the ends of each sleeve being provided with a coupling disk, the two disks being situated adjacent to each other and to the wheel hub of one of the traction wheels, means for selectively coupling one or the other of said disks to said wheel hub, a motor actuated drive shaft, and two trains of continuously meshing gear wheels having different transmission ratios for operatively connecting the drive shaft to both said sleeves.

2. A motor propelled cultivator or small tractor having two traction wheels, a driving axle connecting the two wheels, a sleeve freely turning on the driving axle, a second sleeve freely turning on said first sleeve, each sleeve carrying a toothed coupling disk, a pivoted bolt member mounted for rotation with the driving axle and coacting with the teeth of said coupling disks for selectively locking one or the other of said disks to the driving axle, a motor actuated drive shaft, and two trains of continuously meshing gear wheels having different transmission ratios for operatively connecting the drive shaft to both said sleeves.

3. In combination, a driving axle for motor propelled vehicles, two traction wheels mounted on said axle, a sleeve freely turning on said axle intermediate of the two wheels, a second sleeve freely turning on the first sleeve, adjacent ends of said two sleeves being each provided with a coupling disk, a differential gear mounted on the driving axle intermediate said disks and one of the traction wheels, said differential gear including a satellite wheel carrier rotatable about the driving axle, means for selectively coupling one or the other of said disks to said satellite wheel carrier, a motor actuated drive shaft, and two trains of continuously meshing gear wheels having different transmission ratios for operatively connecting the drive shaft to both said wheels.

4. In combination, a driving axle for motor propelled vehicles, two traction wheels mounted on said axle, a sleeve freely turning on the axle intermediate the two wheels, a second sleeve freely turning on the first sleeve, two adjacent ends of said two sleeves being each provided with a coupling disk, a differential gear mounted on the driving axle intermediate said disks and one of the traction wheels, said differential gear comprising a satellite wheel carrier rotatable about the driving axle, and two bevel sun wheels, one of said sun wheels being keyed to the driving axle having one of the traction wheels keyed thereto, the other sun wheel being keyed to the second traction wheel which is loose relative to the driving axle, means for selectively locking one or the other of said coupling disks to said satellite wheel carrier, a motor actuated drive shaft, and two trains of continuously meshing gear wheels having different transmission ratios for connecting the drive shaft to both said sleeves.

LÉON DUFOUR.